United States Patent [19]

Menard

[11] 4,250,846
[45] Feb. 17, 1981

[54] ELECTRONIC IGNITION SYSTEM AND AN INTERNAL COMBUSTION ENGINE EQUIPPED WITH THIS SYSTEM

[75] Inventor: Christian Menard, Paris, France

[73] Assignee: Thomson-CSF, Paris, France

[21] Appl. No.: 860,492

[22] Filed: Dec. 14, 1977

[30] Foreign Application Priority Data

Dec. 17, 1976 [FR] France .................. 76 38128

[51] Int. Cl.³ .................................. F02P 5/16
[52] U.S. Cl. .................................. 123/414; 123/415; 123/416; 123/643
[58] Field of Search ........... 123/117 R, 117 D, 148 E, 123/146.5 A, 118, 148 ND

[56] References Cited

U.S. PATENT DOCUMENTS

| | | | |
|---|---|---|---|
| 3,621,826 | 11/1971 | Chrestensen | 123/148 E |
| 3,756,212 | 9/1973 | Schirmer et al. | 123/117 R |
| 3,828,742 | 8/1974 | Weis | 123/118 |
| 3,830,207 | 8/1974 | Joseph | 123/117 D |
| 4,024,458 | 5/1977 | Templin | 123/117 D |
| 4,079,709 | 3/1978 | Shuette | 123/117 D |
| 4,104,997 | 8/1978 | Padgitt | 123/117 R |
| 4,112,895 | 9/1978 | Habert | 123/117 R |
| 4,114,574 | 9/1978 | Platzer, Jr. | 123/117 R |

FOREIGN PATENT DOCUMENTS 2252026  6/1975  France ................. 123/117 D

Primary Examiner—Charles J. Myhre
Assistant Examiner—Andrew M. Dolinar
Attorney, Agent, or Firm—Edwin E. Greigg

[57] ABSTRACT

An electronic ignition system for an internal combustion engine allowing precise control of the instant of ignition of the air-fuel mixture, in which the mechanical components, particularly the high voltage distributor, are eliminated. This system comprises a transducer delivering two cyclic sequences of signals synchronous with the position of the stroke of the pistons, means for controlling the instant of emission of the sparks in all the operational states of the engine, distributing means supplying release signals to spark generators connected to the spark plugs. Application to internal combustion engines, particularly to multicylinder engines.

8 Claims, 33 Drawing Figures

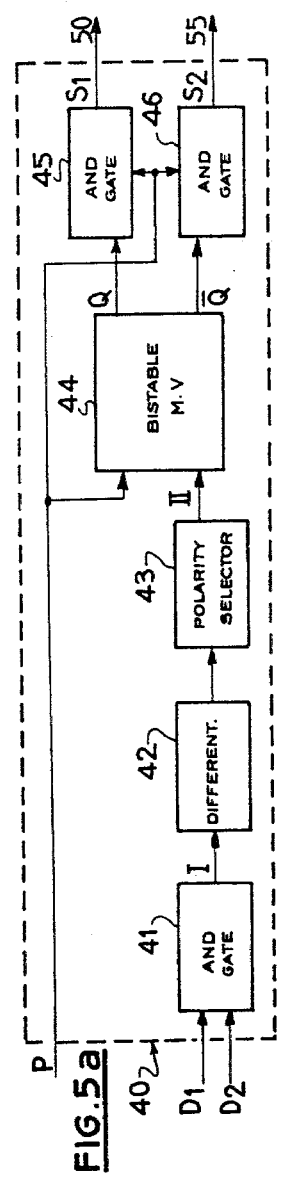
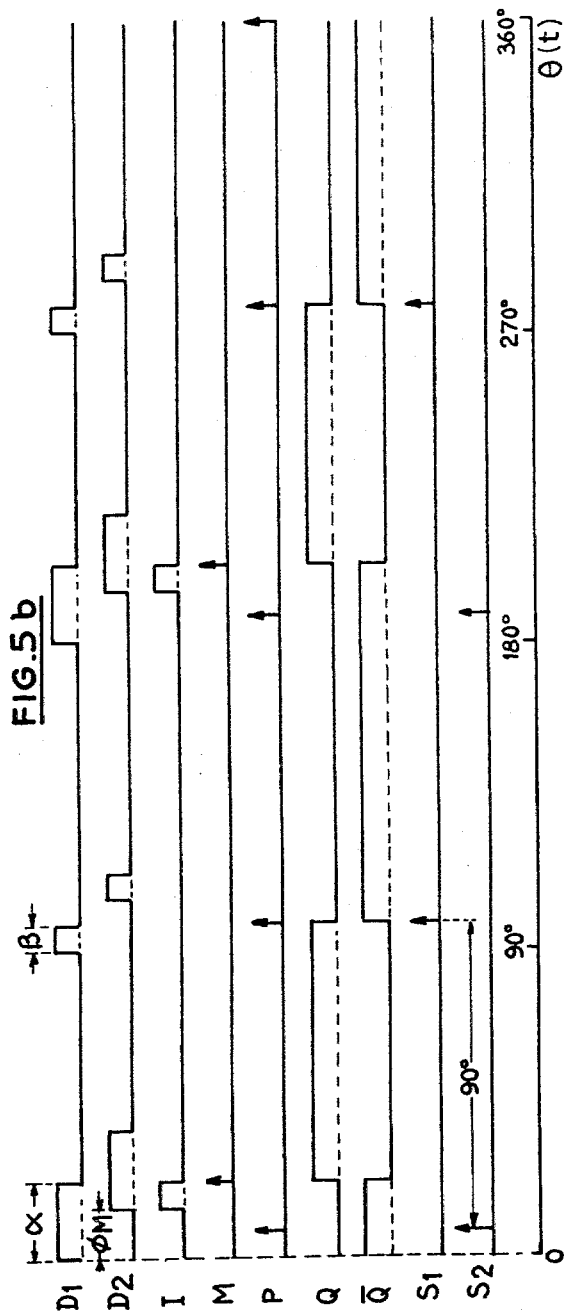
FIG.5a
FIG.5b

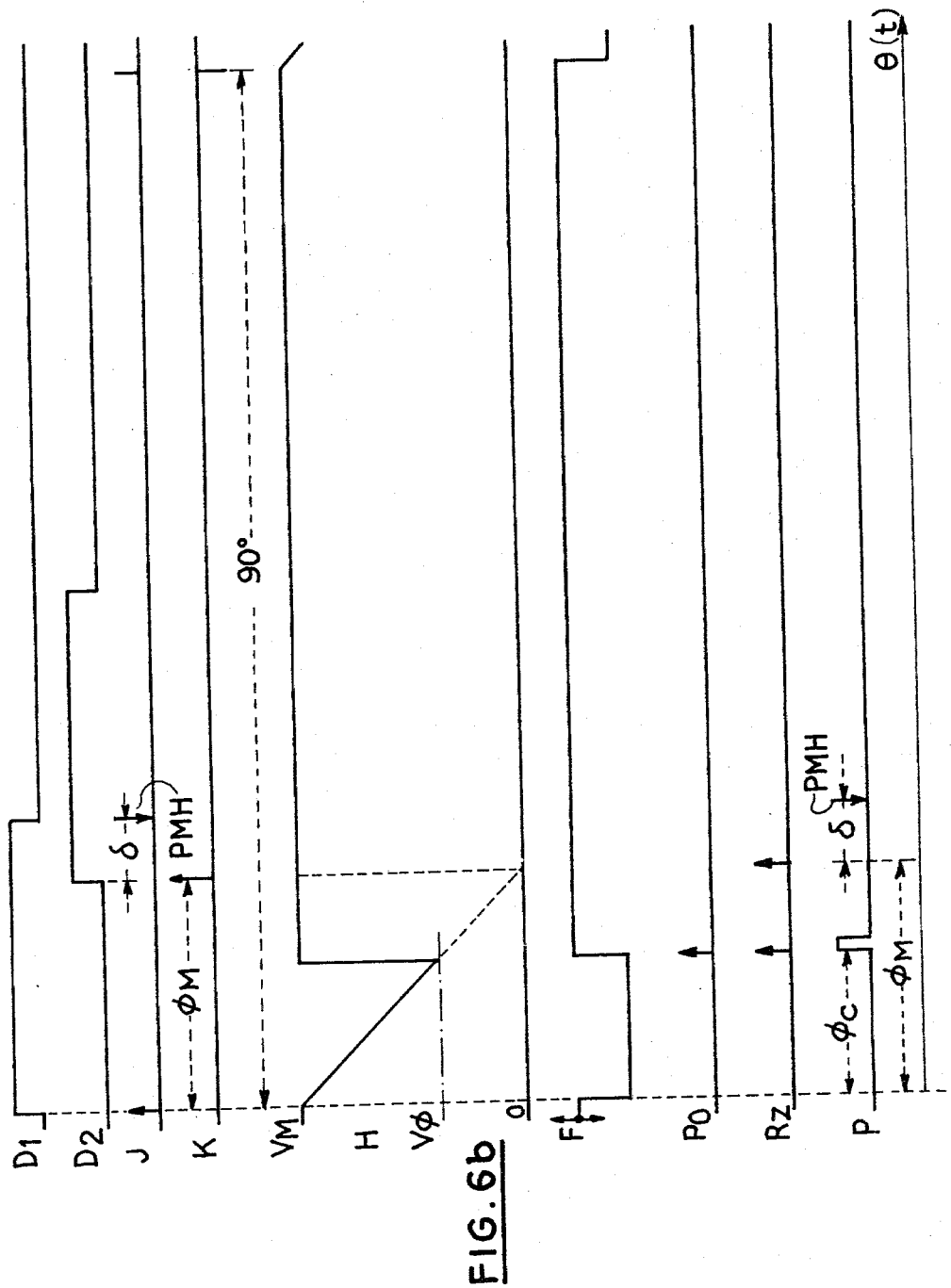

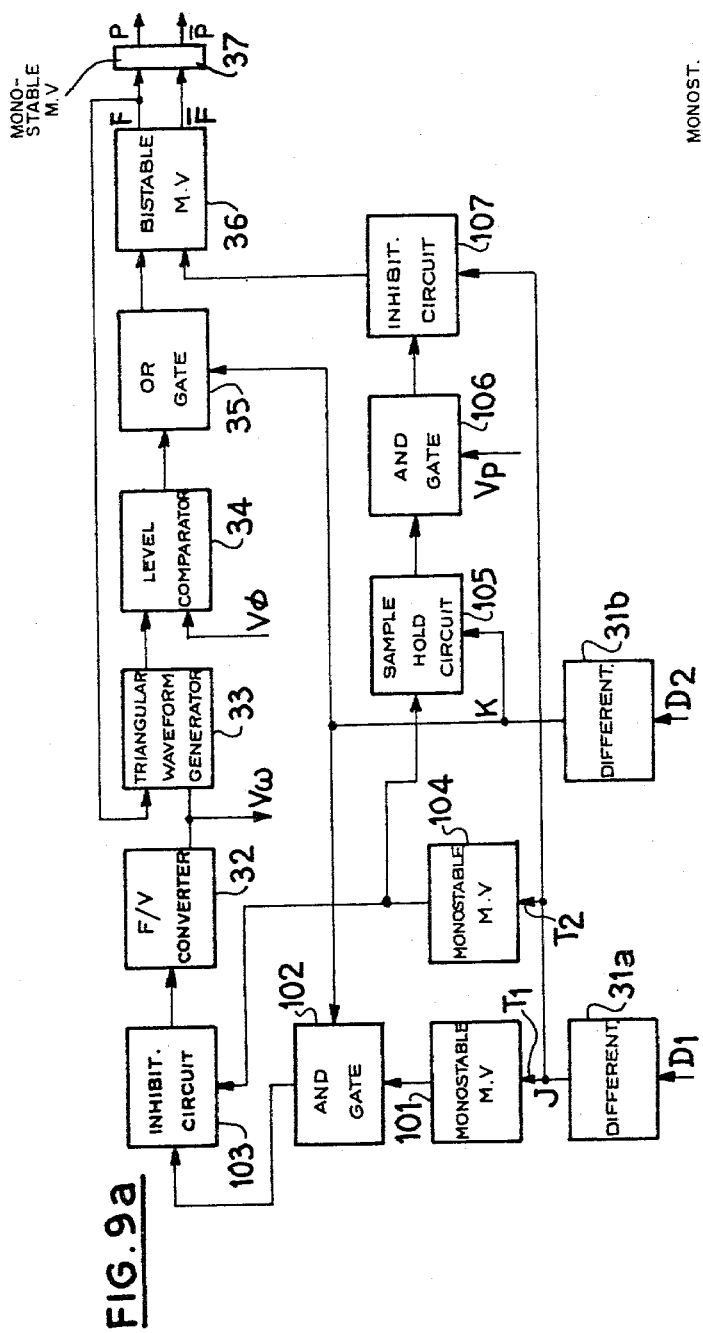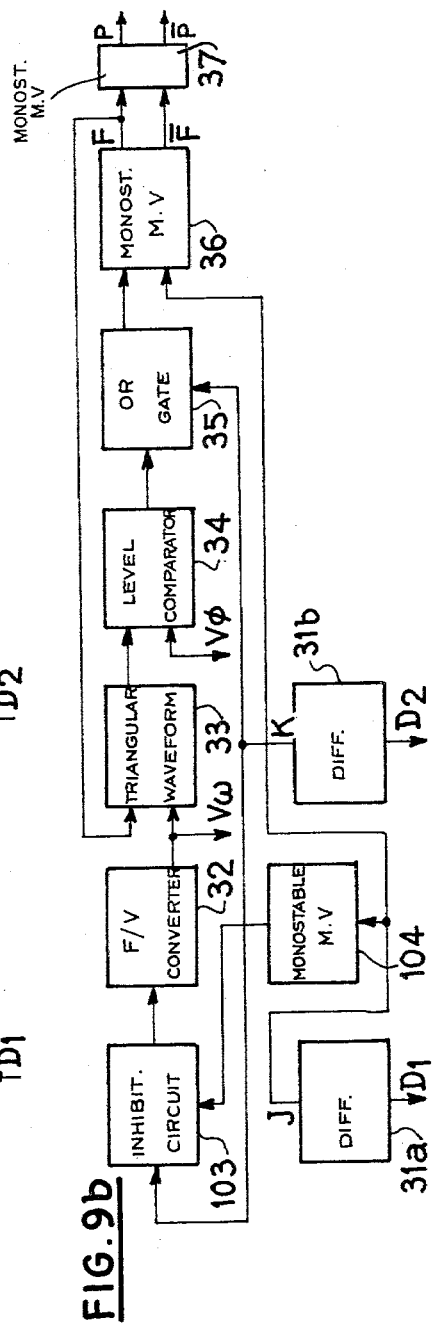
FIG.9a
FIG.9b

ELECTRONIC IGNITION SYSTEM AND AN INTERNAL COMBUSTION ENGINE EQUIPPED WITH THIS SYSTEM

BACKGROUND OF THE INVENTION

This invention is concerned with the field of internal combustion engines employing electronic ingnition. More particularly, the invention relates to an electronic system for igniting the air-fuel mixture injected into the cylinders of an internal combustion engine and, more precisely, to a system of this type which enables the principal mechanical components (contact breaker, distributor, centrifugal advance, etc. . . . ) to be eliminated and which is capable of automatically supplying ignition signals at a precise instant in all the operating modes of the engine and in accordance with the measured parameters of state which are the most representative of these various modes of operation.

Conventional ignition systems, i.e. the ignition systems found in almost all existing combustion engines, typically comprise one or more mechanical contact breakers which control the current passing through the primary winding of an ignition coil in which electrical energy is stored and then released, inducing a very high voltage in the secondary winding of this coil. This very high induced voltage is transferred to the spark plugs through a rotary mechanical commutator commonly known as a distributor.

The various disadvantages attending mechanical contact breakers are well known: erosion of the contacts, deposition of troublesome films, inertia, inherent frequency and contact bounce. The very high voltage distributor is also affected by erosion phenomena and also shows high susceptibility to the ambient conditions. In addition, these conventional ignition systems comprise other mechanisms which are necessary for varying the instant, i.e. the angle, of ignition of the cylinders in dependence upon the operating modes of the engine. These mechanisms are commonly known by the names of "centrifugal advance" and "vacuum correction".

In order to remedy the above mentioned deficiencies of conventional ignition systems, various solutions have been proposed. Some of these solutions have been developed and recently brought into service. They include the "electronic igniters" or spark generators in which the mechanical contact breaker has been eliminated and replaced by solid-state components. Spark generators such as these are at present marketed in two forms, namely coil ignition and ignition by a condenser associated with a step-up transformer.

Although electronic solutions have been proposed in the field of devices for correcting advanced and retarded ignition, their correct operation throughout all the service modes of the engine is often not precise enough and is susceptible to parasitic electrical disturbances. The means necessary for ensuring correct operation of these devices are generally onerous and, as a result, their adoption for practical use has been retarded.

More recently, in the field of distributors, it has been proposed to use spark generators which are sequentially triggered by the electrical signals supplied by an electronic commutator formed by a programmable counter fed by an electrooptical transducer. The present invention seeks to obviate the above-mentioned disadvantages.

SUMMARY OF THE INVENTION

Accordingly, the present invention consists in an electronic ignition system for an internal combustion engine having a plurality of cylinders, comprising a transducer adapted to be coupled to a rotational member of the engine so as to produce output signals in response to rotation of the engine, a controller for controlling the ignition timing of the engine, and a plurality of high voltage pulse generators connectable to the engine spark plugs, and wherein said transducer comprises a rotor having metallic segments of two different lengths which are adapted to cooperate with a pair of magnetic proximity detectors, said detectors being operative to generate first and second sequences of square-wave output signals, the leading edges of the signals of said first sequence representing the maximum angle of advance of the ignition timing and the leading edges of the signals of said second sequence representing the static angle of advance of the ignition timing, and wherein said signals are connected both to a distributor the output of which cyclically triggers said pulse generators, and to said controller, said controller being operative to generate an output signal the phase of which is variable in accordance with the operating conditions of said engine and which is connected to said distributor to control the timing at which said generators are triggered.

In order that the present invention may be more readily understood, various embodiments of electronic ignition system according to the present invention will now be described by way of example and with reference to the accompanying drawings, wherein:

BRIEF DESCRIPTION OF THE DRAWING

FIGS. 5a and 5b show a block diagram of the distribution circuit and the wave forms of signals generated in the distribution circuit.

FIGS. 6a, 6b and 6c show a block diagram of the control circuit and wave forms of signals generated in the circuit and a control function diagram.

FIGS. 9a, 9b and 9c are a block diagram which shows means for avoiding overspeed conditions of the engine and other circuit variations.

DESCRIPTION OF THE PREFERRED EMBODIMENTS

First of all, it is intended briefly to recall the characteristics of a conventional ignition system for eliminating the mechanical high-voltage distributor feeding the spark plugs. The embodiment illustrated applies to an eight-cylinder engine, but is sufficiently general to apply to an engine having N cylinders, N being an odd or even number greater than two.

Figures 1A, 1B:
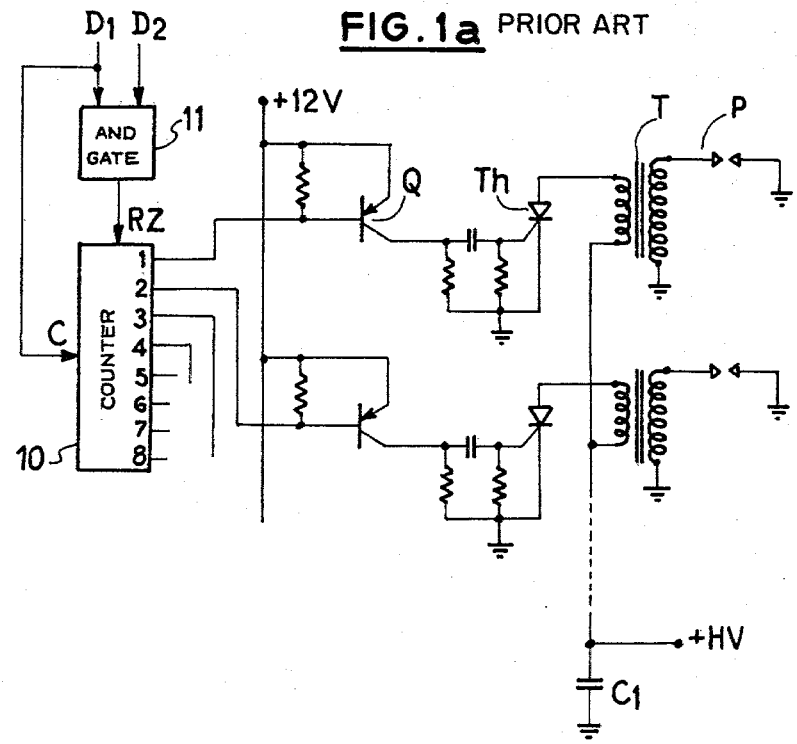
FIGS. 1a, 1b and 1c illustrate an electronic ignition distributor according to the prior art and waveforms of signals generated therein.
Figure 1C:
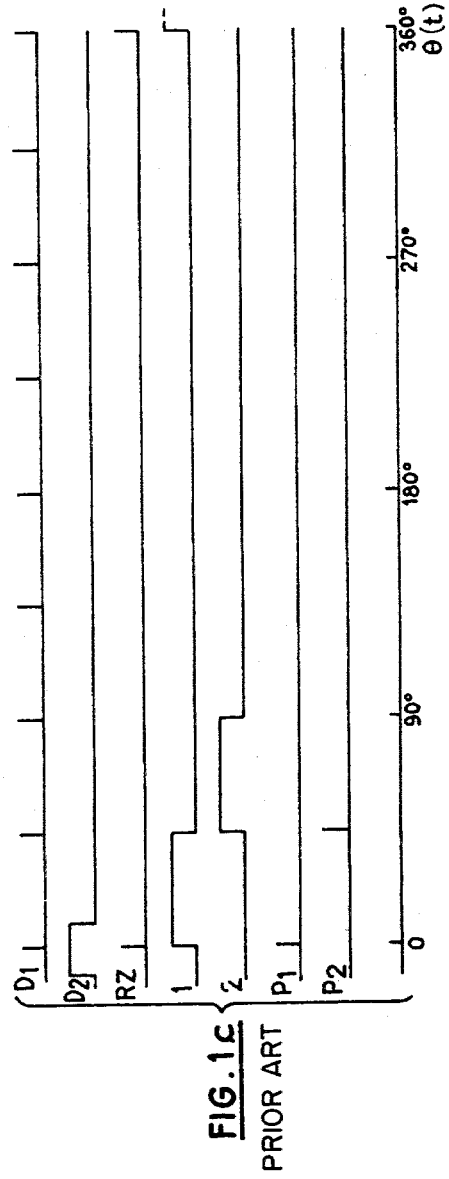

A prior art system for distributing ignition sparks to eight cylinders comprises electronic means illustrated in FIG. 1a and electro-optical means illustrated in FIG. 1b, the wave forms of the corresponding signals being shown in FIG. 1c. The electro-optical means are formed by a transducer (FIG. 1b) which comprises a rotor R and a stator S. The rotor is in the form of an opaque disc formed with eight equidistant circular holes (A) which are intended to mark the position of each of the eight pistons, and with an oblong opening (B) enabling the beginning of the engine cycle to be identified. It will be recalled that one engine cycle corresponds to the sequential ignition of all the cylinders of the engine. The stator comprises a light source (2) and two electro-optical detectors $D_1$ and $D_2$. The wave forms of the signals delivered by the detectors $D_1$ and $D_2$ during an engine cycle are shown in FIG. 1c.

The electronic means, in cases where spark generators of the type comprising a capacitor (C.1) associated with step-up voltage transformers are used, are shown in FIG. 1a. They are essentially formed by a programmable counter (10) of which the zeroing input (RZ) is interfaced by a logic gate (11) of the AND-type fed by the output signals $D_1$ and $D_2$ of the electrooptical transducers driven by the cam shaft of the engine. The counting input (C) of the programmable counter (10) is fed by the output signals of the detector $D_1$. The output signals 1 to 8 of the counter (10) feed 8 spark generators (partly shown). Each of these spark generators comprises: a matching stage, provided by the transistor Q, and a thyristor switching stage (Th) enabling the storage capacitor $C_1$ to be discharged through the primary winding of the step-up transformer (T). This discharge current induces in the secondary winding of the transformer a very high voltage pulse (P) which, when applied to the spark plug, produces the spark for igniting the air-fuel mixture injected into the corresponding cylinder.

Figure 2:
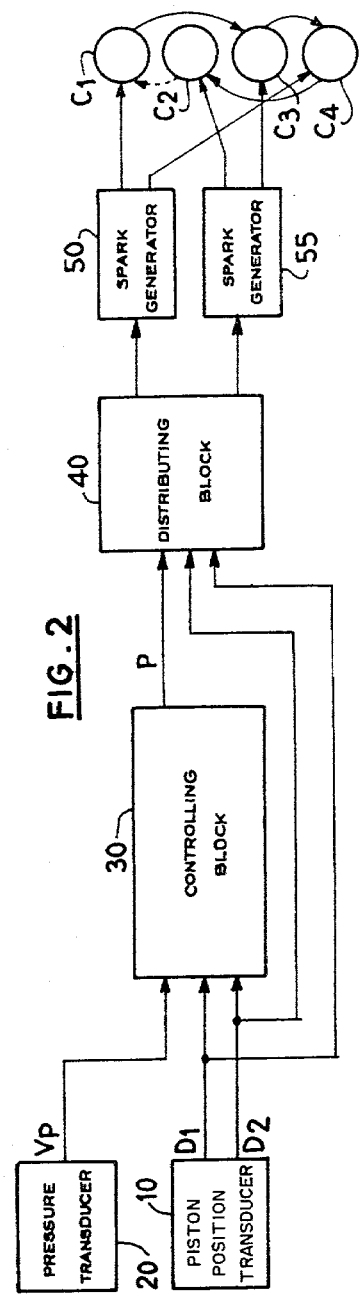
FIG. 2 shows the basic components of an ignition system according to the invention.

The basic configuration of an electronic ignition system according to the invention is shown in FIG. 2 in the form of a simplified block diagram. In the interests of simplicity of the description, the configuration such as illustrated here applies to an engine having four cylinders $C_1$ to $C_4$. The generalisation to an engine having N-cylinders will be dealt with further on.

Firstly, the essential integers will be briefly described, followed by a detailed explanation of what it is which characterises these integers and their various embodiments and modes of application.

The system of FIG. 2 essentially comprises the following elements:

two transducers capable of translating into electrical signals the conditions under which the engine is operating:

(a) a transducer (10) which is keyed to the position of the pistons and which is capable of delivering at two separate outputs $D_1$ and $D_2$ identical and synchronous sequences in the form of electrical signals angularly staggered by an angle $\phi_M$; these electrical signals represent the position of the pistons, the rotational speed of the engine and the phase of the ignition cycle;

(b) a pressure transducer (20) which delivers an electrical signal ($V_p$) representative of the load of the engine and which is generally arranged in the inlet manifold.

A circuit (30) for controlling the instant of occurrence of the ignition sparks; this circuit is fed by the output signals of the above-mentioned transducers enabling the timing of the engine to be electronically varied automatically in dependence upon the measured engine operating conditions. other operating conditions, such as the engine temperature, throttle opening, etc., may be taken into account in order to optimise the ignition timing from auxiliary transducers (not shown). The circuit (30) delivers at its output the pulse signals (P) for triggering the ignition sparks.

A circuit (40) for cyclically distributing the trigger signals (P) to the spark generators (50 and 55); this block is fed by the output signals ($D_1$ and $D_2$) of the transducer 10, enabling the trigger signals (P) produced by the circuit (30) to be sequentially and cyclically distributed through its two output channels.

A circuit comprising two high voltage electrical ignition pulse generators (50 and 55), capable of delivering very high voltage electrical signals to the spark plugs the cylinders $C_1$ to $C_4$; these spark generators are of the symmetrical two-output type enabling a group of two cylinders to be simultaneously fed, and are known per se; the firing order $C_1$, $C_3$, $C_4$ and $C_2$ of the cylinders is arbitrary and may differ according to the numbering adopted by the various engine manufacturers.

The operating phases of an internal combustion engine are various and comprise in particular:

a starting phase characterised by a very low rotational speed of the order of 50 revolutions per minute and by a sometimes highly erratic power supply voltage which can be down to half the nominal voltage of the onboard battery;

a deceleration, or idle, phase under light load, of which the upper limit is situated between 1000 and 1500 revolutions per minute;

a cruising phase under variable load of which the upper speed range is of the order of 5 to 6000 revolutions per minute and sometimes higher;

an overspeed phase, under load or otherwise, which comprises speeds dangerous to the life of the engine.

Means for detecting the various operating phases of the engine and also for ensuring optimum adjustment of the ignition timing and for avoiding overspeeding of the engine will be described hereinafter.

Figure 3A:
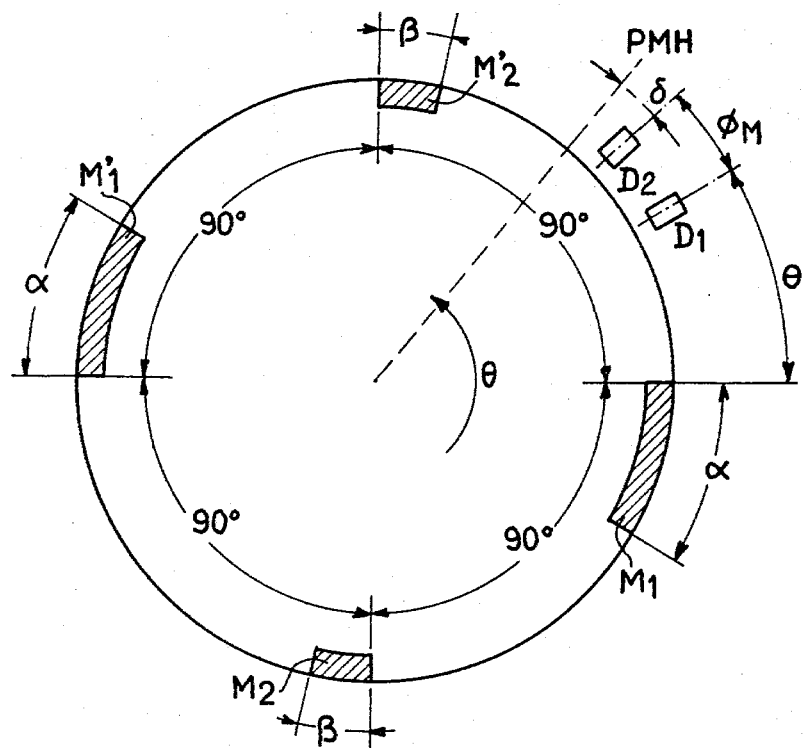
FIGS. 3a, 3b and 3c show a transducer for the position of the pistons and the wave forms of the signals generated by said transducer.
Figure 3B:
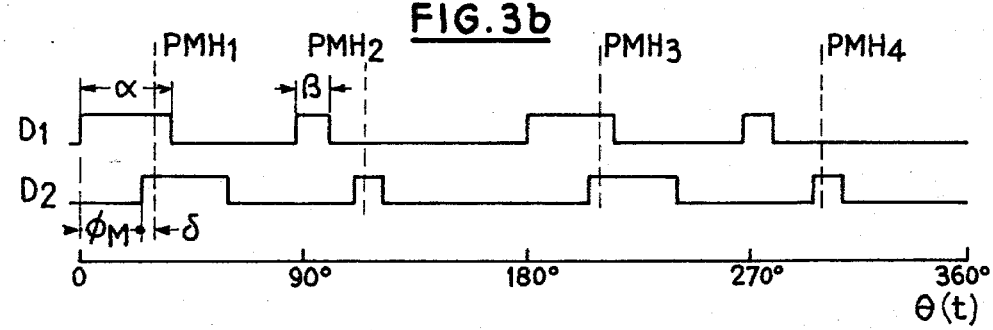

FIG. 3a shows the integers of the transducer for monitoring the position of the pistons and FIG. 3b shows the wave forms of the signals generated at the two output terminals of this transducer. In the embodiment illustrated, it is assumed that the transducer is rotates with the cam shaft which has a rotational speed equal to half that of the crank shaft.

It can be seen from FIG. 3a that the transducer comprises a disc cam shaft of the engine and which is equipped with four metallic segments ($M_1$, $M'_1$, $M_2$ and $M'_2$) and with an assembly of proximity detectors $D_1$ and $D_2$ which are fixed for example to the engine frame and which detect the passage of the metallic segments. The proximity detectors are spaced at a fixed, predetermined angle $\phi_M$ which is at least equal to the dynamic ignition advance angle. The metallic segments or sectors carried by the disc are angularly spaced at an angle of 90°. The sectors $M_1$ and $M'_1$ are long sectors and occupy an arc $\alpha$ larger in value than the angle $\phi_M$. Conversely, the sectors $M_2$ and $M'_2$ are short sectors and occupy an arc $\beta$ smaller in value than the angle $\phi_M$. For example, for a value of the angle $\phi_M$ equal to 20°, the axes $\alpha$ and $\beta$ may have values of 24° and 16°, respectively. The output signals delivered by the transducer are shown in FIG. 3b. It can immediately be seen that the pulses $\alpha$ generated by the long sectors partially overlap whereas the pulses $\beta$ generated by the short sectors are separate. An engine cycle, i.e. corresponding to the firing of all the cylinders, is covered by a complete rotation of the disc or 360°. The position of the TDC of the piston is shown at PMH and the angle $\delta$ between PMH and the proximity detector $D_2$ corresponds to the static advance angle. This static advance angle may be varied by arranging both the detectors $D_1$ and $D_2$ on a member which is readily displaceable relative to the rotor or, conversely, if the detectors $D_1$ and $D_2$ are fixed, the disc may be keyed in an adjustable manner to the rotational shaft of the engine which in the present embodiment is the cam shaft. The value of the angle $\delta$ may be negative or positive, depending upon the type of engine in question.

Figure 3C:
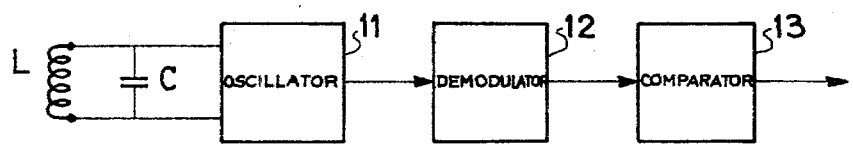

The proximity detectors may with advantage be of the self-oscillating type with variable damping, the damping being provided by the conductive metallic sectors. FIG. 3c shows the constituent circuits of a proximity detector of the type mentioned above in the form of a simplified block diagram. A proximity detector is formed by a reactance coil (L) tuned by a capacitor (C) to a frequency generally situated in the range from 2 to 10 Mc/s. This circuit LC is associated with a transistor (11) functioning as an oscillator. The passage opposite the reactance coil (L) of the disc, of which the alternate segments are conductive or non-conductive, produces through induced Foucauld currents a damping of the circuit and, hence, a modulation of the oscillation amplitude of the transistor. The output of the oscillating transistor (11) is detected (demodulated) by a stage (12) and the envelope signals are applied to a level comparator stage (12) which produces a high level when the metallic segments pass opposite the coil (L) and a low level in the absence of these conductive sectors. Proximity detectors such as these are widely developed and marketed in integrated form. Finally, it should be noted that the disc may be made of a metallic material with the sectors being made of an inactive material. Modifications to the construction of the disc would make it possible to use detectors of the electro-optical type or of the Hall effect type which are capable of delivering output signals of equivalent performance.

Figure 4A:
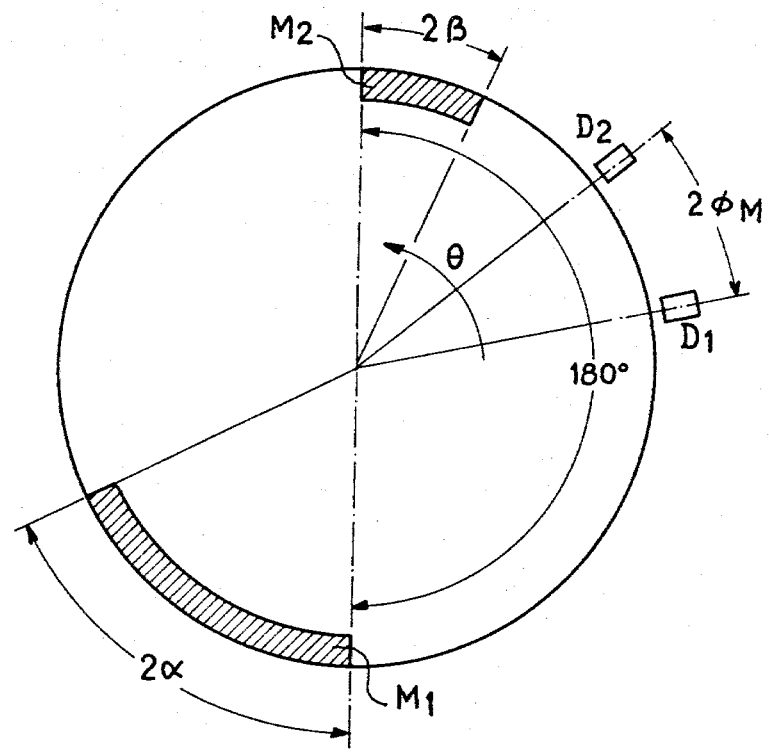
FIGS. 4a and 4b show a variant of the transducer and wave forms shown in FIGS. 3a, 3b and 3c.
Figure 4B:
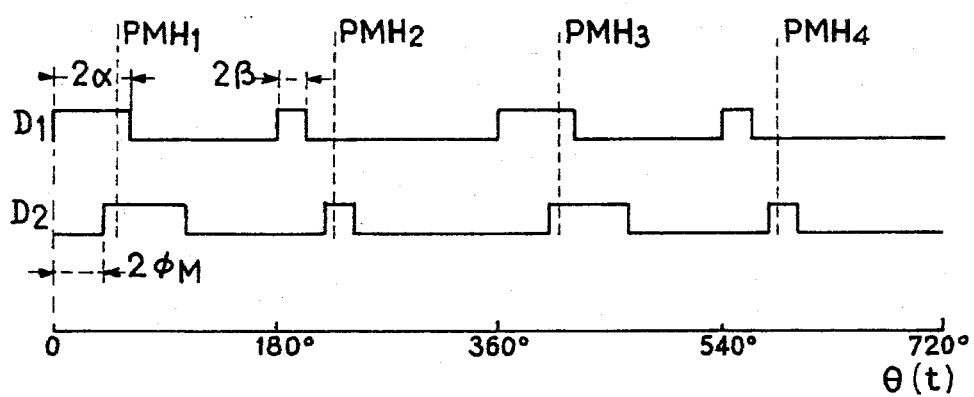

The transducer which has just been described has a configuration determined by the fact that it is driven by a shaft referenced to the cam shaft of the engine. The same results may be obtained by means of a transducer of which the configuration is that shown in FIG. 4a and which is driven by the crank shaft. In this configuration, there are two metallic segments, namely, $M_1$ and $M_2$, spaced at an angle of 180°. The lengths of the arcs of the metallic segments are thus $2\alpha$ and $2\beta$, respectively, and the angular spacing separating the two proximity detectors $D_1$ and $D_2$ has a value of $2\phi_M$. In this case, as indicated in FIG. 4b, which shows the wave forms of the output signals of the detectors $D_1$ and $D_2$, one engine cycle is equivalent to two complete turns of the crank shaft, corresponding to a 720° rotation of the disc. This configuration of the transducer provides for simplification both in assembly and in construction. For example, it is sufficient to arrange the metallic segments $M_1$ and $M_2$ on the flywheel positioned at the output end of the crank shaft.

There shall now be described the integers of the circuit (40) for sequentially and cyclically distributing the release signals for the generators (50 and 55), as shown in FIG. 2. The elements of the circuit (40) are shown in FIG. 5a in the form of a simplified block diagram and the wave forms of the signals produced by the various circuits are shown in FIG. 5b.

The circuit (40) comprises a stage (41) formed by a logic gate of the AND-type which, at its two inputs, receives the output signals $D_1$ and $D_2$ supplied by the transducer (10). This gate delivers signals (I) of which the angular duration is equal to $(\alpha-\phi_M)$ and the repetition period is equal to twice the repetition period of the sequence signals $D_1$ and $D_2$. These signals (I) are differentiated in a high-pass stage (42) and are then applied for example to a biassed amplifier stage which only retains the pulses corresponding to the trailing edge of the signal (I). The stage (43) delivers a pulse signal (M) which is applied to the input of a bistable trigger circuit (44) of which the other input receives the signal (P) produced by the circuit (30) FIG. 2. This pulse-form signal (P), of which has a repetition frequency is equal to that of the sequence signals $D_1$ and $D_2$, is situated angularly between the leading edges of the signals $D_1$ and $D_2$ and forms the trigger signal for the spark generators (50 and 55). At its outputs, the bistable trigger circuit (44) delivers complementary gating-pulse signals Q and $\bar{Q}$ which are applied to two logic gates (45 and 46) of the AND-type which both receive the trigger signals P at their other inputs. The output signals ($S_1$ and $S_2$) of the gates (45 and 46) are taken to the spark generators (50 and 55). The angular distance between the pulses of sequence $S_1$ or $S_2$ is 180° and the relative angular stagger between the two sequences is 90° by virtue of the use of spark generators capable of simultaneously feeding two cylinders.

There shall now be described the circuit (30) for controlling and triggering the sparks for igniting the air-fuel mixture injected into the cylinders of the engine.

Figure 6A:
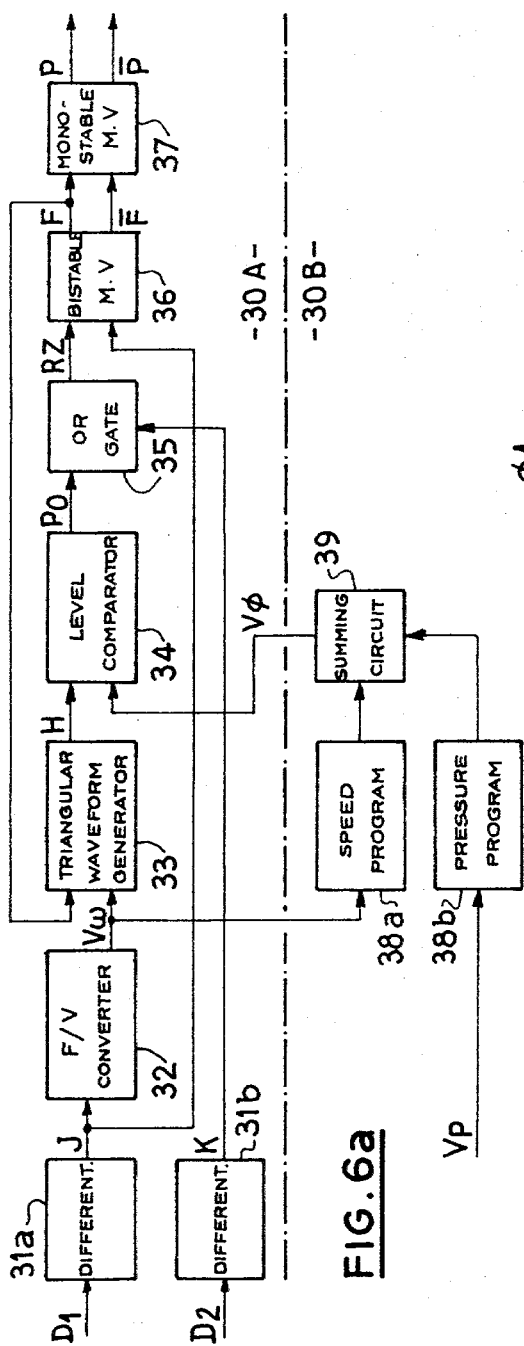

The circuit (30) is shown in FIG. 6 in the form of a detailed block diagram; it will be described with reference to FIG. 6b which shows the wave forms of the signals associated with the various circuits. In FIG. 6b, the signals are shown in the interests of greater clarity on an enlarged angular scale and, as a result, only a quarter or 90° of the ignition cycle is shown, the wave forms being identical and repetitive throughout one complete ignition cycle of the engine.

The circuit (30) comprises two separate parts:
the circuits (30B) for calculating the ignition advance-retard ($V_\phi$) commands in dependence upon the operating condition of the engine, and
the circuits (30A) for translating the commands $V_\phi$ into variations of the instant, or point, of ignition of the cylinders of the engine. The circuits (30A) are fed by the signals $D_1$ and $D_2$ delivered by the transducer 10 and by advance-retard signals ($V_\phi$) produced by the calculation circuit (30B). The sequences of signals $D_1$ and $D_2$ are sequences synchronous with the rotational speed of the engine and their angular stagger is equal to an angle $\phi_M$ corresponding at least to the maximum dynamic range of variation of the ignition phase. The phase of the squence $D_1$ is advanced by an amount ($\phi_M+\delta$) relative to the TDC whilst the phase of the sequence $D_2$ is advanced by an amount ($\delta$) relative to the TDC. It will be recalled that the angle $\delta$ is the fixed, predetermined static advance angle for a given type of engine and is obtained by mechanical keying of the transducer for the position of the stroke of the pistons. The frequency of the pulseform signals of the sequences $D_1$ and $D_2$ is proportional to the rotational speed of the engine.

The signals $D_1$ and $D_2$ are initially applied to two differentiator stages (31a and 31b) which enable the leading edges of these signals to be selected. The stage (31a) delivers the signal (J) and the stage (31b) the signal K. The signal J is applied to a frequency-voltage converter (32) which delivers a continuous signal ($V_\omega$) proportional to the rotational speed of the engine. It should be noted that the signal K may also be applied to the converter stage (32).

The output signal ($V_\omega$) of the converter (32) feeds a triangular signal generator (33) at one of its inputs. The second input of the generator (33) is fed by the output signal of a bistable trigger circuit (36) which is released by the signals (J), thus initialising the beginning of the triangular signal. After scaling of the control signals and the time constants of the circuits, this arrangement enables a triangular signal to be produced, of which the gradient $dV/d\phi$ is independent of the rotational speed of the engine and of which the instantaneous amplitude value represents the phase or position of the pistons.

The triangular output signal (H) of the generator (33) is compared with the advance-retard command signal ($V_\phi$) in a level comparator (34). When the values of these two signals coincide, the comparator delivers a pulsed signal ($P_o$). The signal ($P_o$) and the signal (K) are applied to a logic gate (35) of the OR-type, of which the output signal feeds the zeroing input RZ of a bistable trigger circuit (36). The output (F) of the bistable trigger circuit (36) returns to the initial level on receipt of a signal from gate 35 and thus enables the generator (33) to its original level $V_M$.

The signal (F) of the bistable trigger circuit (36) is applied to a monostable multivibrator (37) which delivers a pulse P during the leading transition of the signal F. Accordingly, this pulse P results from the transfer of the signal K without any phase shift or from the transfer of the signal J with a phase shift ($\phi_c$) in accordance with the advance-retard command $V_\phi$. By virtue of the use of a bistable circuit (37), the signal $\overline{P}$ complementary to P is available at the second output. This remark is also valid for the bistable trigger circuit (36) where the signal $\overline{F}$ complementary to F is available.

Figure 6C:
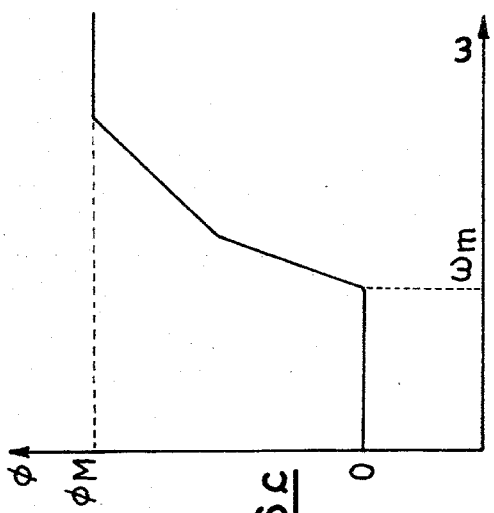

The circuits (30B) enable the advance-retard command to be produced in dependence upon the rotational speed and load of the engine. The rotational speed of the engine, available in the form of the output signal ($V_\omega$) of the converter 32, is applied to a speed-dependent advance program circuit (38a). The law of this program is generally established experimentally and, in practice, is approximated by segments of straight lines, such as shown in FIG. 6c. A circuit capable of producing functions such as these is provided by an amplifier associated with networks of diodes, as known per se. Similarly, the law of advance as a function of the load of the engine is empirically established. The signal $V_P$ representing the load of the engine is applied to the input of a load-dependent advance program circuit (38b) formed as before by an amplifier associated with networks of diodes. The adder circuit (39) calculates the weighted sum of the output signals of the circuits (38a and 38b) and delivers the advance-retard command signals $V_\phi$.

The circuit (30) operates as follows:

When the rotational speed of the engine is low, for example of the order of 1000 revolutions per minute corresponding to the starting phase, to the deceleration phase and to low loads, the value of the signal $V_\phi$ is zero and the angle $\phi_c$, FIG. 6b, is equal to $\phi_M$ and the ignition advance decreases to the angle $\delta$ or static advance angle.

When the engine is cruising, corresponding to rotational speeds situated between 1000 and 6000 revolutions per minute for example, the value of the signal $V_\phi$ increases in accordance with the law of the speed programme. At its limit, $V_\phi$ is equal to $V_M$, the angle $\phi_c$ assumes a zero value and the dynamic advance angle is equal to $\phi_M$. Accordingly, the total advance based on the TDC is equal to the angle ($\phi_M+\delta$). In this dynamic operating range, the advance angle is modulated by the load of the engine in accordance with the law of the load program. The above characteristics have been given in a descriptive sense, their exact values depending upon the type of engine in question.

The basic elements which will be used for detecting the rotational speed ranges of the engine and, in particular, the thresholds of the bottom and top speeds will be described in the following.

When a transducer for measuring the rotation of a shaft, similar to that described above, delivers two sequences of signals ($D_1$ and $D_2$) which are synchronous and angularly staggered by an angle $\phi_M$, the following relation is fulfilled:

$$\phi_M = T_\omega = (\pi TN)/60 \text{ (radians)}$$

where
T = the time stagger of the two sequences
$\omega$ = the angular frequency of the signals of each sequence
N = the rotational speed of the engine in revolutions per minute.

Since the phase angle $\phi_M$ is a constant predetermined at the design stage, the rotational speed of the engine may be obtained by measuring the relative time stagger between the two sequences. One means commonly used for effecting this measurement of the time T consists in counting the time stagger T between the two sequences.

Now, the embodiment described provides means capable of detecting speed ranges which consist in detecting the when the signals of one sequence fall within time slots produced by the signals of the other sequence.

Figure 7A:
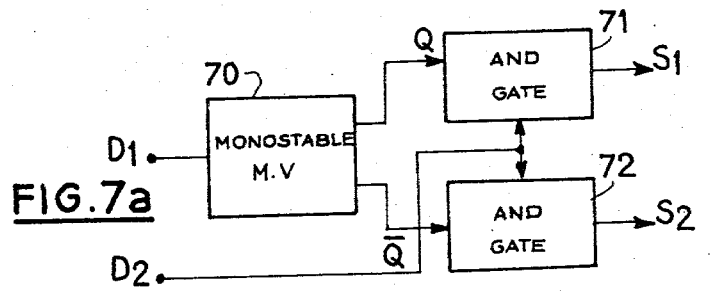
FIGS. 7a, 7b and 7c are block diagrams which show the discriminating elements for the rotational speed of the engine and the wave forms of the signals generated by the transducer.
Figure 7B:
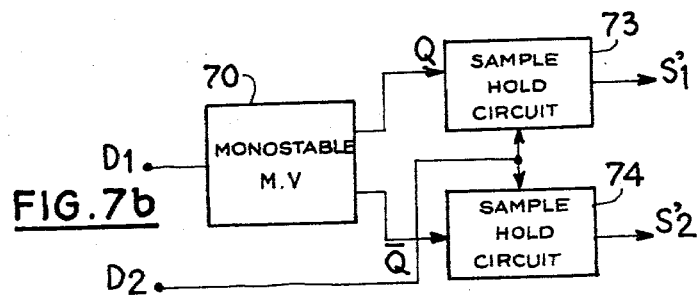
Figure 7C:
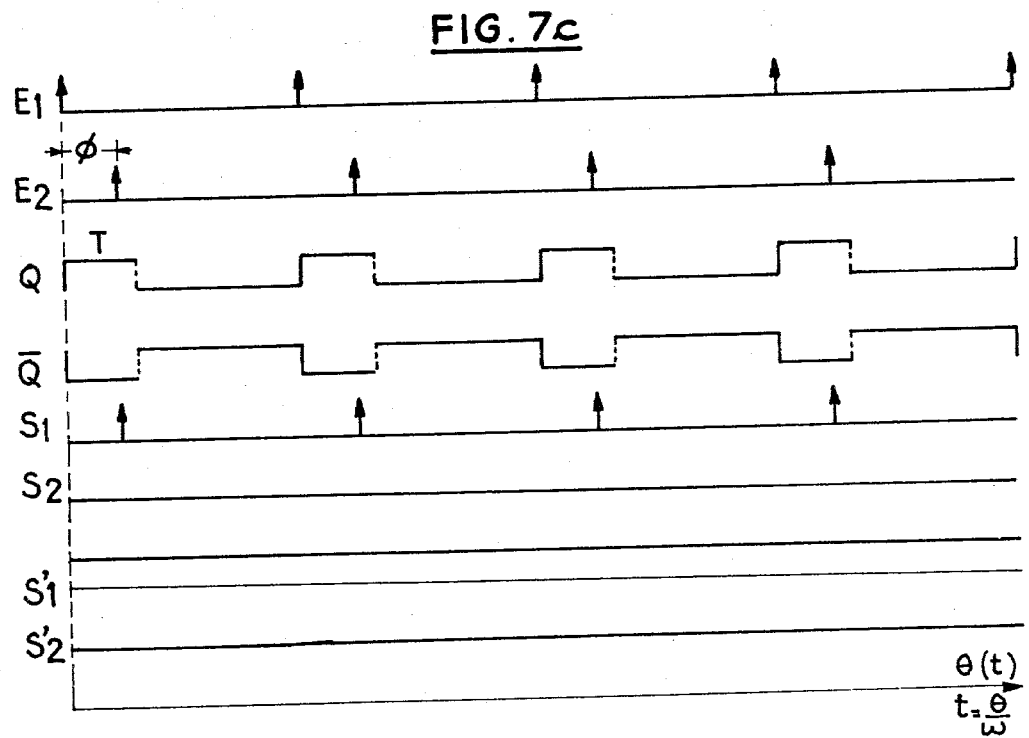

The determination of a speed range above or below a given speed may be obtained by means of elements such as those shown in FIGS. 7a and 7b, of which the wave forms of the associated signals are shown in FIG. 7c. A rotational speed discriminator circuit comprises a monostable multivibrator (70) of fixed, predetermined duration T which is released by one of the sequences $D_1$ or $D_2$ and a coincidence circuit enabling the simultaneous presence of the signals of the other sequence to be detected. The coincidence circuit may be a logic gate or a sample-and-hold circuit.

FIG. 7a shows a speed discriminator of which the coincidence circuit is formed by logic gates (71 and 72) of the AND type. The monostable multivibrator (70) is fed for example by the sequence $D_1$ and runs for a fixed, predetermined time T. The outputs Q and $\bar{Q}$ of the multivibrator feed two ANd-gates (71 and 72) which receive the sequence $D_2$. When the rotational speed $\omega$ is below the quotient $T/\phi$, the signals of the sequence $D_2$ are transferred to the output $S_2$ and, conversely, when the rotational speed $\omega$ is above the quotient $T/\phi$, the signals of the sequence $D_2$ are transferred to the output $S_1$.

A similar circuit using a coincidence circuit of the sample-and-hold type is shown in FIG. 7b. The multivibrator stage (70) is identical with that of FIG. 7a and feeds the two sample-and-hold circuits (73 and 74). The operation of this type of speed discriminator remains identical with that shown in FIG. 7a. In this case, the output sinals $S'_1$ and $S'_2$ are continuous signals characterised for example by a high or low level. In FIG. 7c, the signal wave forms are indicated by the condition $\omega > \phi/\Gamma$.

The use of one or several frequency discriminators makes it possible to define the speed operating range of treatment or calculation circuits. In order to illustrate a direct application, there shall be considered a frequency-voltage converter operating between two speed ranges $\omega_m$ and $\omega_M$ corresponding respectively to a minimum speed range and to a maximum speed range.

Figure 8A:
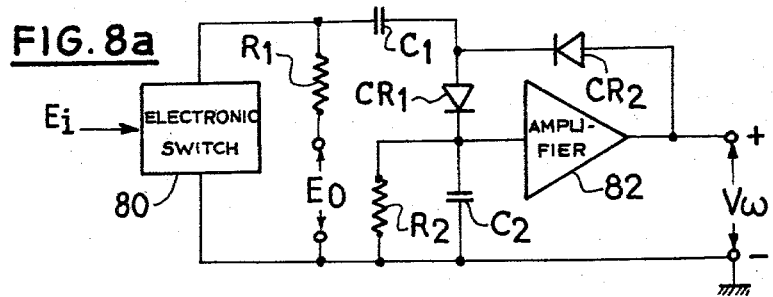
FIGS. 8a, 8b, 8c and 8d show a frequency-voltage converter having delimited operational ranges, a frquency discriminator and characteristic diagrams.
Figure 8B:
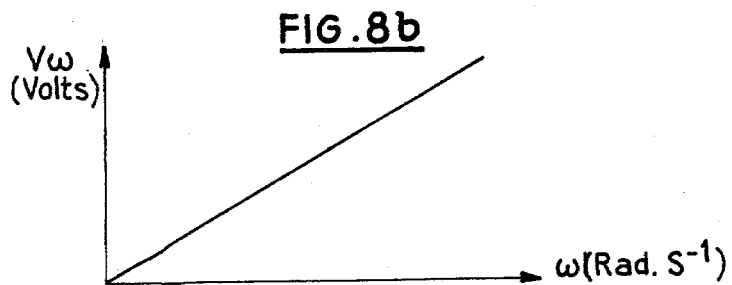

FIG. 8a shows a frequency-voltage converter of the diode counter type comprising diodes $CR_1$ and $CR_2$ controlled by an electronic switch (80) and an amplifier (81) with a gain of one. The transfer characteristic of this type of converter is shown in FIG. 8b, the output voltage ($V_\omega$) being proportional to the input frequency $\omega$ of the signal $E_i$.

Figure 8C:
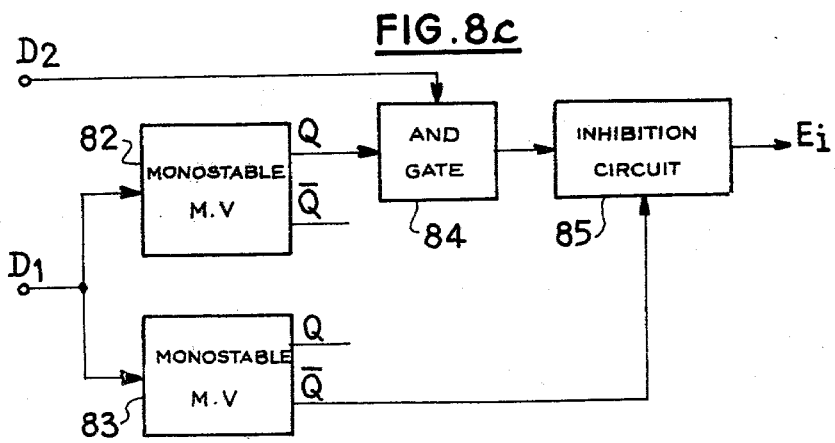

FIG. 8c shows a frequency discriminator with two speed levels $\omega_m$ and $\omega_M$ utilising the techniques described above. The signals of the sequence $D_1$ simultaneously release two monostable multivibrators (82 and 83) of which one runs for a period $T_1$ of $\cap/\omega_m$ and the other for a period $T_2$ of $\phi/\omega_M$. The output signal Q of the multivibrator (82) feeds a logic gate (84) of the AND-type which receives the signals of the sequence $D_2$. The output signal $\bar{Q}$ of the multivibrator (83) feeds an inhibition circuit (85) which receives the signals of the sequence $D_2$ transferred through the logic element (84). At the output $E_i$, the signals of the sequence $D_2$ are only transferred when the frequency of the signals is comprised between the values $\omega_m$ and $\omega_M$.

Figure 8D:
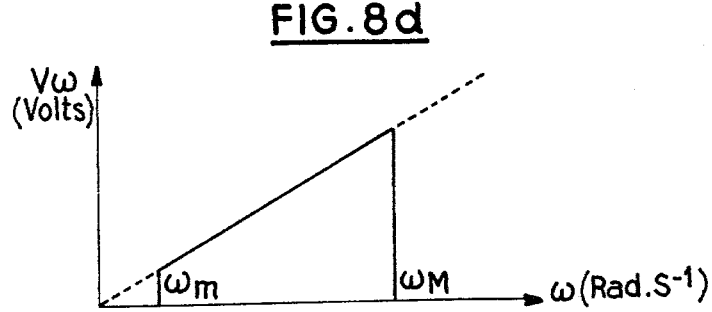

If a speed discriminator such as that shown in FIG. 8c and a frequency-voltage converter are associated, the transfer characteristic of the association is that shown in FIG. 8d. The output voltage $V_\omega$ is zero when the frequency $\omega$ is below $\omega_m$ and then increases linearly to a value $\omega_M$ beyond which the voltage $V_\omega$ assumes a zero value.

After having described the means for discriminating the various operational states of the engine, particularly the low speed states corresponding to the starting period and to the deceleration phases, and the high speed state corresponding to the overspeeds, there shall now be described the application of these means for controlling the release of the ignition sparks. Thus, there is provided a first means for cancelling the dynamic ignition advance when the rotational speed of the engine exceeds a maximum value $\omega_M$, a second more radical means for interrupting ignition beyond that rotational speed $\omega_M$ and a third means for increasing the safety of operation of the ignition system in the low speed states for rotational speeds below a value $\omega_m$. These means may be combined so as to reduce the number of circuits. It may be necessary to consider two overspeed states, namely a state of overspeed free from load and a state of overspeed under load. When the engine is operating free from load, so that it is disconnected from the load or the remaining torque is substantially zero, it may be necessary to cut ignition and, possibly, the supply of fuel very rapidly. When the engine is operating under load, it is generally sufficient to reduce the dynamic ignition advance more or less rapidly.

FIG. 9a, in which the elements of FIG. 6a are used again, shows a circuit for controlling the spark generators equipped with means for discriminating the rotational speed states of the engine and hence for acting on the firing conditions of the cylinders. FIG. 9a shows only the part (30a) of the circuit (30), the part (30b) remaining identical.

The means for discriminating the range of speeds below a minimum speed $\omega_m$ is formed by:
- a monostable multivibrator (101) triggered by the signals J corresponding to the leading edge of the signals of the sequence $D_1$ delivered by the differentiator circuit ($31_a$), the running time $T_1$ of the multivibrator being equal to $\phi_M/\omega_m$,
- a logic gate (102) of the AND-type fed by the output of the multivibrator (101) and by the signals (K) corresponding to the leading front of the sequence $D_2$.

The means for discriminating the range of speeds above a maximum value $\omega_M$ is formed by:
- a monostable multivibrator (104) triggered by the signals (J) corresponding to the leading front of the signals of the sequence $D_1$ delivered by the differentiator circuit ($31_a$), the running time $T_2$ of the multivibrator (104) being equal to $\phi_M/\omega_M$;
- an inhibition circuit (103) which receives both the signals of the monostable multivibrator (104) and the output signals of the gate (102);
- a sample-and-hold circuit (105) which receives the output signals of the monostable multivibrator (104) and the signals K corresponding to the leading front of the signals of the sequence $D_2$.

At the input of the frequency-voltage converter (32), the combination of the means for discriminating the low rotational speeds and the overspeeds enable the circuits (33 and 34), of which the function is dynamically to vary the angular ignition advance, to be rendered inoperative. Below the minimum speed $\omega_m$ and beyond the maximum speed $\omega_M$, it is only the signals K corresponding to the static advance which trigger the spark generators.

The circuits (105, 106 and 107) enable ignition to be interrupted when the rotational speed of the engine is above $\omega_M$ and when the load of the engine is low or zero. To this end, a logic gate (106) of the AND-type receives the output signal of the sample-and-hold circuit (105) and, the output signal $V_P$ of the vacuum transducer (20) or an equivalent signal representative of the load of the engine. The output signal of the gate (106) is applied to an inhibition circuit 107 which, receives the signals (J). In the overspeed condition coupled with a low load, the pulse-form signals K are not transmitted to the bistable trigger circuit (36), thereby interrupting the triggering of the spark generators. It will be noted that the output signal of the circuit (105) may be used for other purposes, for example for cutting the supply of fuel to the engine or for setting off an alarm.

Although extremely complete means for controlling the multiple states of the engine have just been described, it should be understood that this configuration of circuits may be simplified according to the types and conditions of use of the engine.

The integers shown in FIG. 9b are identical with those in FIG. 9a. The elements (101 and 102) which enable the safety of operation at low speeds to be increased have been eliminated. Similarly, the circuits (105,106 and 107) for differentiating the overspeed states under load and free from load have been eliminated. In this case, the firing of the cylinders is maintained throughout all the operating states of the engine and the ignition advance is equal to the static advance for speeds below $\omega_m$ and above $\omega_M$.

Figure 9C:
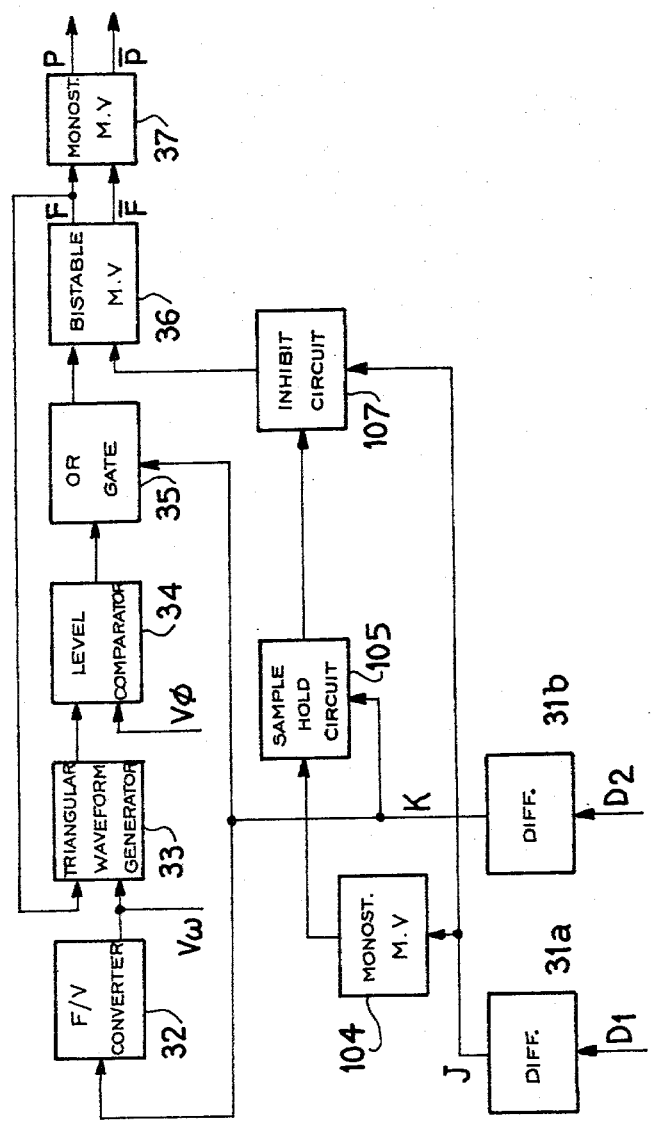

FIG. 9c shows a variant of FIG. 9b. The overspeed states under load and free from load are not differentiated and the firing of the cylinders is interrupted in the event of overspeeding. Only the monostable circuit (104), the sample and hold circuit (105) and the inhibition circuit (107) have been retained.

Figure 10A:
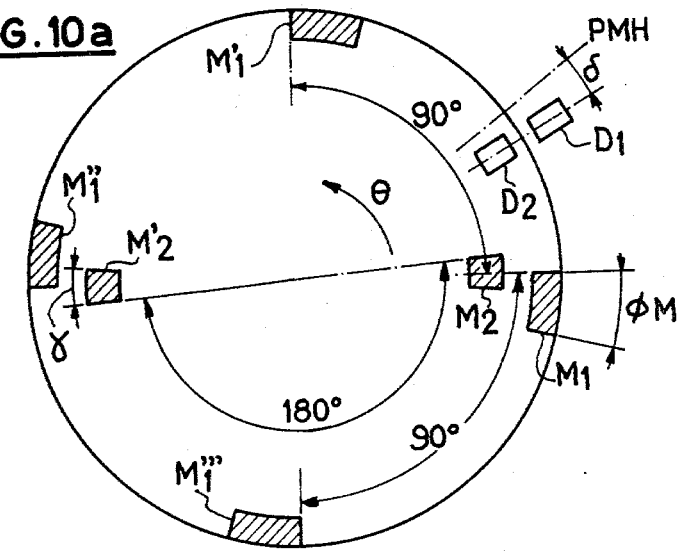
FIGS. 10a, 10b and 10c show a variant of the transducer shown in FIGS. 3a and 3c and the wave forms of the corresponding signals.

FIG. 10a shows a variant of the transducer shown in FIG. 3a which provides an equivalent means of producing the signals of the ignition cycle, the ignition signals corresponding to the maximum dynamic advance and the signals corresponding to the static advance, after treatment and combination of the signals delivered by the proximity detectors $D_1$ and $D_2$.

In FIG. 10a, the rotor comprises four conductive metallic segments $M_1$ to $M_1'''$ arranged for example at the periphery of the rotor and two conductive metallic segments $M_2$ and $M_2'$ arranged on a circumference of smaller diameter. The value of the arcs of the segments $M_1$ to $M_1'''$ is equal to $\phi_M$ corresponding to the dynamic advance range. The value of the arcs of the segments $M_1$ and $M_2$ is equal to $\gamma$ of the order of a few degrees. For a transducer intended for a four-cylinder engine, with the cam shaft taken as reference, the segments $M_1$ to $M_1'''$ are spaced at 90° and the segments $M_2$ and $M_2'$ are spaced at 180°. The relative keying of the two rows of segments is that shown in FIG. 10a. The proximity detectors $D_1$ and $D_2$ are arranged in a line and staggered at an angle $\delta$ relative to the TDC, the angle $\delta$ corresponding to the positive or negative static advance angle, depending upon the type of engine in question.

Figure 10B:
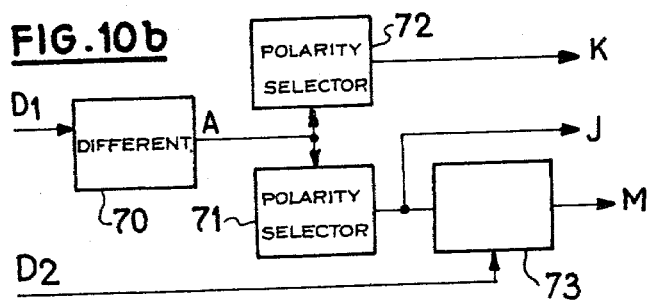
Figure 10C:
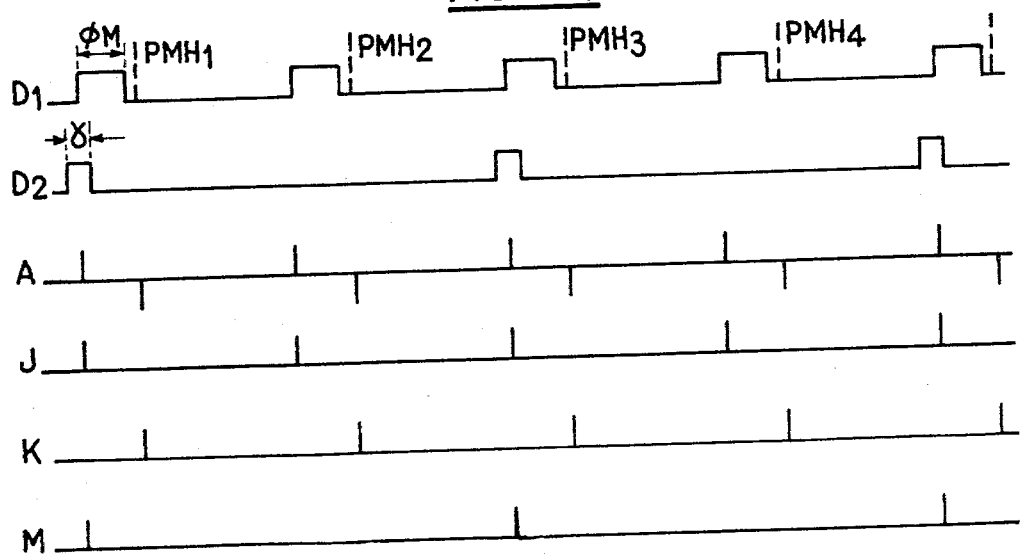

FIG. 10b shows the treatment and combination circuits for the output signals $D_1$ and $D_2$ associated with the transducer, whilst FIG. 10c shows the wave forms of the corresponding signals. The signals of the sequence delivered by the detector $D_1$ are differentiated in a differentiator stage (70). The output signals (A) of this stage are applied to two polarity selectors, namely a selector (71) which transfers the signals corresponding to the leading edge of the signals $D_1$ in the form of signals (J) and the selector (72) which transfers the signals corresponding to the trailing edges of the signals $D_1$ in the form of signals (K), this selector simultaneously acting if necessary as a polarity inverter. The output signals of the selector (71) are delivered to a logic circuit (73) of the type AND which simultaneously receives the signals of the sequence $D_2$. The output signals (M) of the circuit (73) feed the input of the bistable trigger circuit (44) shown in FIG. 5A.

Figure 11A:
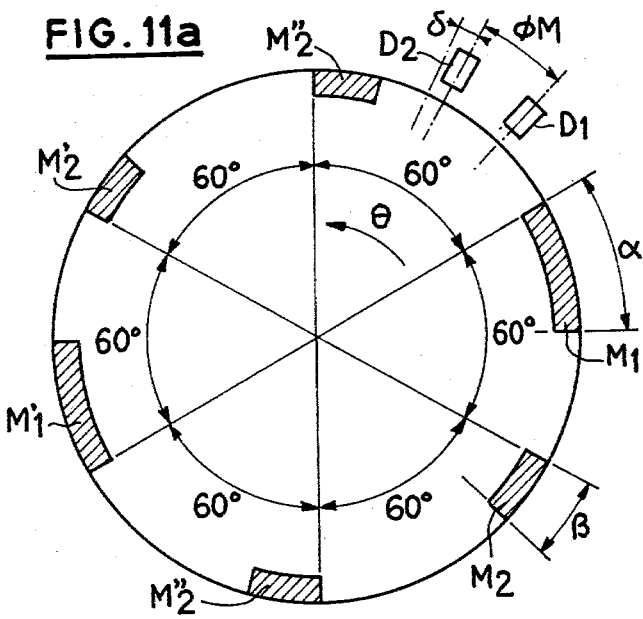
FIGS. 11a, 11b, 11c and 11d show a transducer for the position of the stroke of the pistons for a 6-cylinder engine and a distribution circuit and the wave forms of the signals generated by the transducer and distribution circuit.

FIG. 11a shows a transducer adapted for a six cylinder engine. The configuration of the transducer is similar to that of the transducer of FIG. 3a, the only difference residing in the angular spacing of the conductive metallic segments M which, in the case of a six cylinder engine, have a value of 60°.

Figure 11B:
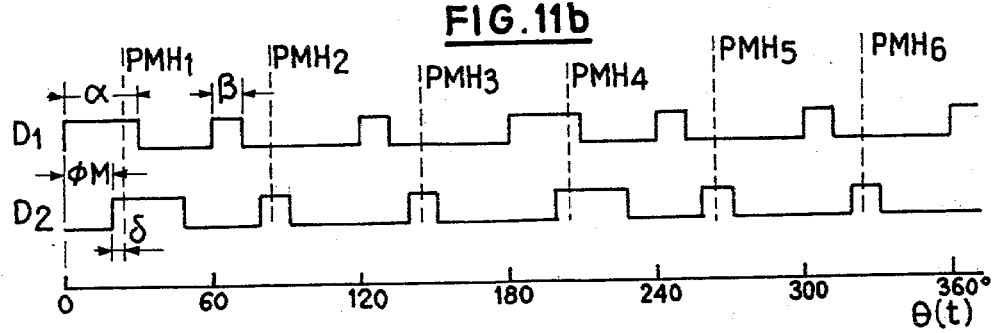

FIG. 11b shows the wave forms of the output signals of the proximity detectors $D_1$ and $D_2$.

Figure 11C:
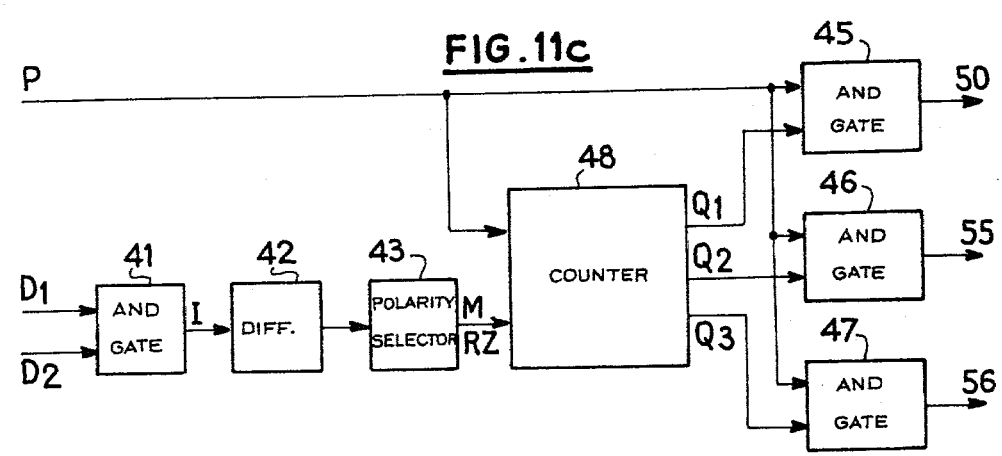
Figure 11D:
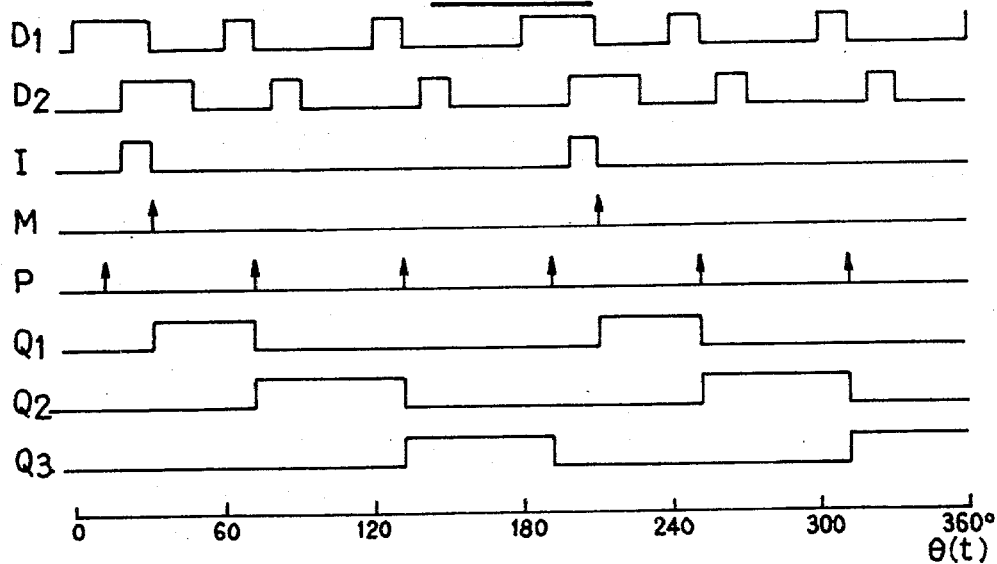

FIG. 11c shows the constituent elements of the distribution circuit for the signals P triggering the spark generators (50, 55 and 56). The circuits (41, 42 and 43) are identical with those illustrated in FIG. 5A. The element (48) is a programmable counter which, at its zeroing input RZ, receives the signals for the beginning of the ignition cycle M and, at its other input, the counting signals P which ensure the progression of the counter. The output signals Q, $Q_1$ and $Q_3$ of the counter (48) are applied to three logic circuits (45, 46 and 47) of the AND-type which simultaneously receive the trigger signals (P). The wave forms of the signals corresponding to the circuits of FIG. 11c are shown in FIG. 11d.

Figure 12A:
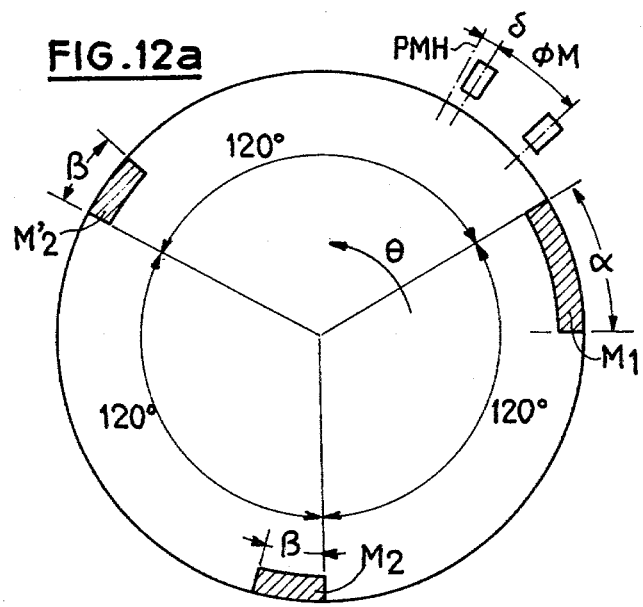
FIGS. 12a and 12b show a transducer for the position of the stroke of the pistons for a 3-cylinder engine and also show the wave forms of the signals generated by the transducer.
Figure 12B:
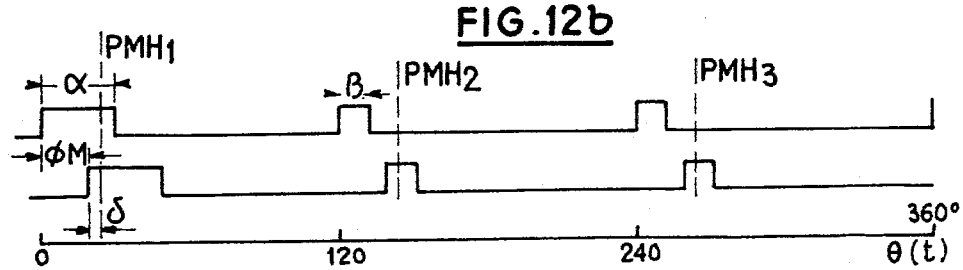

FIG. 12a shows a transducer for the position of the stroke of the pistons adapted for a three cylinder engine and, more generally, for an engine having an odd number of cylinders. The rotor comprises three conductive metallic segments: a segment $M_1$ of arc $\alpha$ and two segments $M_2$ and $M_2'$ of arc $\beta$, the angular spacing between the segments being 120°. The wave forms of the output signals of the proximity detectors $D_1$ and $D_2$ are shown in FIG. 12b. This type of odd-configuration transducer means that the distributor (44) shown in FIG. 3a is of the programmable counter type with three states and has three spark generators connected to each of the three cylinders of the engine.

The advantages afforded by electronic ignition systems of the type described herein over the prior art are very considerable.

The mechanical components of conventional ignition systems are eliminated. The transducer for monitoring the position of the pistons, of which various embodiments have been described, is particularly simple to use. The transducer delivers two sequences of output signals from which it is possible directly to obtain: the phase of the ignition cycle, the ignition points corresponding to the static advance, the ignition points corresponding to the maximum dynamic advance, the rotational speed of the engine and, at the same time, to discriminate between the various operating ranges of the engine.

The circuit for controlling automatically the instants at which the ignition sparks are generated provides for precise, reliable ignition in accordance with the various operating states of the engine and, in particular, enables the overspeed conditions under load and free from load to be avoided.

During the starting phase of the engine, during which the output voltage delivered by the onboard battery is reduced, the critical elements, such as the dynamic advance phase shifter and the circuits for calculating the advance-retard commands are rendered inactive, whilst the active elements formed by less critical circuits eliminate the need to use auxiliary power sources.

In engines having an even number of cylinders, the transducer for the position of the pistons may be directly fixed to the crank shaft.

The foregoing relates to preferred exemplary embodiments of the invention, it being understood that other embodiments and variants thereof are possible within the spirit and scope of the invention, the latter being defined by the appended claims.

What is claimed and desired to be secured by Letters Patent of the United States is:

1. An electronic ignition system for an internal combustion engine including a crankshaft, an even number of pistons coupled to said crankshaft, and a like even number of cylinders associated respectively with said even number of pistons, each cylinder including a sparkplug, wherein said electronic ignition system comprises:

a transducer means for monitoring the position of the pistons, said transducer means being physically coupled to the engine crankshaft and generating two identical trains of electric pulsed signals, a first and a second signal train, said first signal train being angularly displaced with respect to said second signal train by a quantity at least equal to the maximum angle of dynamic advance of the engine, each of said first and second signal trains being formed by pulses having equally angularly spaced leading edges, and having predetermined angular lengths, the number of pulses per revolution of the crankshaft being equal to half of the number of engine cylinders, at least one of said number of pulses having an angular size greater than the angular displacement of said first and second signal trains, at least one of said number of pulses having an angular size less than the angular displacement of said first and second signal trains and the forward edge of said pulses having a phase reference to the top dead center of the engine pistons;

a controller means for automatic ignition advance, said controller means generating control signals for the instant of ignition of the engine and comprising two control channels, a first channel and a second channel, the first channel being synchronized by said first signal train, the second channel being synchronized by said second signal train;

an electronic distributor means for said control signals for the instant of ignition of the engine, said distributor means being connected to said transducer means for monitoring the position of the pistons and comprising, connected in series, a logical coincidence circuit of said first and second signal trains and a counter having a number of stable output states equal to half of the number of cylinders, said counter being incremented by said control signals for the instant of ignition of the engine, and associated in parallel, a plurality of selection gates connected in correspondence to the outputs of said counter, said selection gates having common inputs connected to said controller means for automatic ignition advance; and a plurality of spark generators of the type having symmetrical outputs, the control inputs of which are connected in correspondence to the outputs of said selection gates, said spark generators being connected to the spark plugs of the engine.

2. An electronic ingition system in accordance with claim 1, wherein said transducer means for monitoring the position of the pistons comprises:

a plurality of segments disposed in one plane and driven in rotation in synchronism with the crankshaft and two fixed proximity detectors physically positioned in such a manner as to detect the passage of said segments, a first detector which delivers the first signal train and a second detector which furnishes the second signal train, the first detector being angularly displaced with respect to the second detector by a quantity at least equal to the maximum angle of ignition advance of the engine; said driven segments having angularly equally spaced leading edges and having predetermined angular lengths, the number of said segments being equal to half the number of cylinders, and half of said plurality of segments having an angular length greater than the angular displacement of said first and second detectors and the other half of said plurality of segments having an angular length less than the angular displacement of said first and second detectors.

3. An electronic ignition system for an internal combustion engine having four cylinders, as defined in claim 2, wherein the transducer means for monitoring the position of the pistons comprises two segments of unequal angular length having diametrically disposed leading edges.

4. An electronic ignition system, as defined in claim 2, wherein said segments are electrically conductive, and the proximity detectors are identical detectors of the self-oscillating type, damped by the proximity of an electrically conductive body.

5. An electronic ignition system for an internal combustion engine, as defined in claim 1, wherein said electronic distributor means comprises a bistable multivibrator of the RS type.

6. An electronic ignition system, as defined in claim 1, which further comprises at least one rotary engine speed detector, said detector including a monostable multivibrator connected to be triggered by the forward edge of the pulses of the first signal train and at least one logical operator of the AND type having a first input connected in series with said monostable multivibrator and a second input connected to receive the second signal train.

7. An electronic ignition system, as defined in claim 1, which further comprises at least one rotary engine speed detector, said detector comprising, connected in series: a monostable multivibrator triggered by the forward edge of the pulses of the first signal train and at least one sample-and-hold circuit having a first input connected to said monostable multivibrator and a second input connected to receive the second signal train.

8. An electronic ignition system as defined by claim 1, wherein said controller means includes the following elements connected in series: a frequency-to-voltage converter, a sawtooth generator, a level comparator, and a bistable multivibrator, and wherein said frequency-to-voltage converter is of the diode counter type.

* * * * *